March 10, 1959 J. G. REID, JR., ET AL 2,877,388

ELECTRONIC COMPONENT ASSEMBLY STRUCTURE

Filed July 21, 1954

INVENTORS
JOSEPH G. REID, Jr.
JOSEPH A. GENOVESE

BY

Wayne M. Hart
ATTORNEY

United States Patent Office 2,877,388
Patented Mar. 10, 1959

2,877,388

ELECTRONIC COMPONENT ASSEMBLY STRUCTURE

Joseph G. Reid, Jr., Washington, D. C., and Joseph A. Genovese, Hyattsville, Md., assignors to ACF Industries, Incorporated, New York, N. Y., a corporation of New Jersey Application July 21, 1954, Serial No. 444,788

10 Claims. (Cl. 317—101)

This invention relates to improvements in techniques and supporting structures for electronic components. Although the invention is capable of being used with most types of component and in most equipment, its field of primary importance is in equipment operating in the radio and frequency ranges such as television receivers, oscilloscopes, electronic counters and others.

In electronic equipment fabrication, a considerable amount of hand labor is involved. There is a present trend toward mechanization, and recognizing this, an object of this invention is to provide an inexpensive structure on which to mount components and form circuits or parts thereof, which structure is well suited for rapid assembly by machines, preferably simple adaptations of existing machines.

In much existing electronic equipment, the components, notably resistors and capacitors, have no means of support other than the leads which are soldered in circuit, and therefore dependent for their mechanical support on the other components, wires or parts. An object of this invention is to provide component supporting panels adapted to hold one or more components and thereby provide a well defined structural support for them, and do this in such a way that the support panels are capable of rapid machine manipulation and assembly. The support panels then serve two purposes, the first is to provide a supporting medium for the components, and the second is to establish a uniform shape that may be handled readily by machine. Of course, it is not essential to the invention that the panels be machine assembled, but it is one of many factors that makes attractive the use of such panels.

The mounting of components on panels is but the initial step in the realization of the full benefits of the teachings of the invention. Each panel is apertured, preferably but not necessarily at one edge. Then a specially constructed strip may be used as a support on which the panels are fitted, the latter being held in place by friction between the strip and panel aperture walls, aided by solder or an adhesive, or unaided. The support may have one or more types of an assortment of openings to assure uniform or otherwise proper spacing of the panels and to interfit with the panel slots thereby helping to hold the panels assembled with the support strip.

An important object of the invention is to provide an assembly of electronic components as described, and in such a way that the panels may be continually fitted on the support and the support severed at predetermined lengths to form individual units containing a circuit. The circuitry is engineered beforehand, and the components thereof are connected by conductors which extend longitudinally of the support and are carried by it. These conductors may be conventional wire adhered to the support, as by being partially embedded in it, or they may be of another character, as electro-deposited or sprayed or processed thereon in some other known way. At intervals of length, the support may be weakened along a transverse line so that the support strip may be easily broken both accurately and rapidly.

A specific object of the invention is to provide an electronic assembly which comprises components carried by panels, each panel having a slot at one edge of it which is fitted in a notched support strip in order to assemble the panels with the strip, the panels and strip being dielectric material, as ceramic or plastic and having conductors carried thereby which connect when the panels are inserted on support strip. Accordingly, after the components are attached to the panels, the final assembly of components into a circuit or partial circuit may be accomplished as quickly as fitting the panel slots on the support strip.

Other objects and features of importance, such as air circulation freedom about the components, will become apparent in following the description of the illustrated embodiments of the invention.

The invention has the twofold general purpose of providing a well defined support for components, particularly resistors and capacitors, and of providing this support in such a way that the parts may be assembled rapidly by machine. To accomplish this, a support in the form of an elongated strip 10 is produced of an insulating material, as ceramic or plastic. If plastic is selected, it should have properties such that it will withstand soldering temperatures, about 500 degrees F., without harm. There are many commercially available synthetic resins, known well in this art, which may be used.

Conductors 12, 14, 16, 18, 20 and 22 respectively extend longitudinally of strip 10 and are carried by it. Although there are six conductors shown, this merely illustrates the fact that one or more may be used. Instead of six, the strip may have a larger or smaller number. The conductors may be wires cemented on the surfaces of strip 10, or partially embedded in the same surfaces, or they may be processed thereon. By processed circuitry is meant electrical circuitry with or without components, which is produced by one or more mechanical, thermal, or chemical steps applied for developing a circuit array as a unified pattern. It is a generic expression intended to include among others the steps covered by the specific nomenclature, printed, etched, plated, sprayed, stamped, embossed circuits.

Support strip 10 is the base on which insulating panels such as plates 24 are mounted. The strip 10 may be made in long lengths and cut or broken into small pieces prior to or after the plates 24 are assembled on it. To facilitate separation of small pieces from the strip 10, transverse weakened portions along lines 26 are provided in strip. This may be done in a variety of ways such as by scoring, perforating or reducing cross sectional area.

The plates 24 may be made of ceramic or a synthetic resinous material, and they too should be made of material which will withstand, without harm, soldering temperatures in the order of 500 degrees F. There is no reason for restricting all plates 24 to a single material. Some may be plastic (synthetic resin) while others are ceramic, as steatite. There is a real advantage in this. Plastic plates may be handled roughly and there will be no loss due to breakage, while steatite is brittle. But, steatite has a dielectric constant far superior to most synthetic resins. Accordingly, so-called conventional components may be mounted on plastic plates and assembled on strip 10, while steatite or other type ceramic plates 24 may be used when the component on it is subjected to a high heat load, or the component is unusual, for example, resistor 28 made as described in Patent No. 1,771,236, or the plate actually enters the system as a portion of a component. In connection with the latter, an example is a capacitor with ceramic dielectric, and metal films on opposite surfaces.

Figure 2:
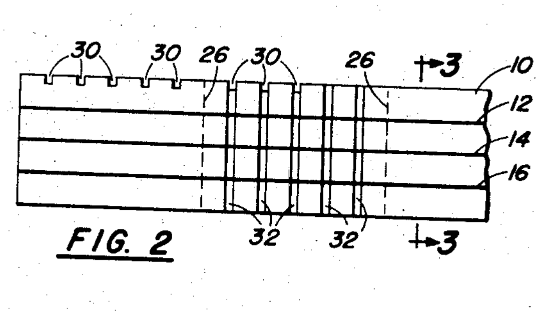
Figure 2 is an elevational view of a support strip having a variety of notches in it to coact with the panel slots when the panels are assembled with the support as in Figure 1.

Notches such as the grooves 30 are formed in one edge of part of strip 10, and they are spaced an amount determined to be the desired spacing of plates 24. Laterally opening recesses such as the grooves 32 extend transversely across strip 10 and are formed in one or both sides of the strip. They may be formed in line with notches 30, or may be used without the notches, each alternative being shown in Figure 2. As also disclosed in this figure, the recesses and notches may be completely omitted. The functions of the notches 30 and/or recesses 32 are to assure uniform plate 24 spacing on strip 10 and to coact with the plates in assisting to hold them securely on strip 10.

Figure 3:
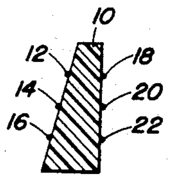
Figure 3 is a sectional view taken on the plane of line 3—3 of Figure 2.

Plate 24 is preferably polygonal with an aperture, such as the recess or slot 34 near one corner, that is, offset from a centerline of the plate in order to leave a larger unbroken surface area on plate 24 to accommodate a component. Moreover, slot 34 is generally wedge-shaped, that is, one wall is sloped with respect to the other so as to make an obtuse angle with the adjacent edge of the plate. Strip 10 is similarly shaped in cross section, see Figure 3.

Figure 7:
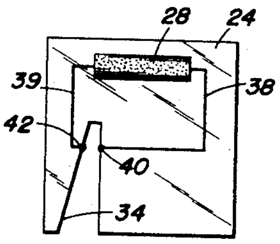
Figure 7 is a plan view of a modified form of panel, the shape of the slot differing from that of Figure 6 and its location in the panel is quite different from Figure 6.

In preparing plates 24 for assembly with support strip 10, the components are secured thereto, by any suitable means, as cementing, riveting or soldering. If a tape or direct deposition carbon resistor 28 is used (Fig. 7), the necessary wiring 38 and 39 should be formed as a processed circuit, and the wire ends terminate at 40 and 42. These terminals are preferably small quantities of solder, and they are located at or in slot 34 and at a predetermined part thereof so as to coincide with and touch the proper conductor on strip 10. Where a more common type of component is to be used, as a cylindrical resistor 46 with wire leads, it may be cemented to its plate and the leads brought to the terminals; or held thereon by riveting the leads to the plate. Eyelets 48 may be used for this purpose. In the latter case, also connected to the eyelets 48 are wiring 50 and 51, ending in terminals 52 and 54 similar to terminals 40 and 42. The wiring 50 and 51 may be made as a processed circuit, or conventional wires may be used. In either instance, the component enters into the circuit of the entire unit through the agency of this wiring and its terminals.

The shape of slot 34 and plate support strip 10 has the advantage of permitting the terminals 40 and 42 and any others which may be present to pass over each of the strip conductors, except those on which the terminals seat. There is no scraping over the conductors 12, 14, 16, 18, 20 and 22 and any others which may be on the strip 10.

Figure 4:
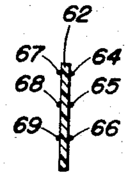
Figure 4 is a transverse sectional view of a modified form of support strip.

Instead of using a slot with one or two sloping walls, slot 58 as in plate 60 may be used. This slot has parallel sides and will be fitted on flat strip 62 (Fig. 4) having longitudinal conductors 64, 65, 66, 67, 68 and 69 thereon, similar to the conductors on strip 10. The location of slot 58 in plate 60 shows that it may differ from the corner disposition of Figure 7. However, the advantage of having the slot in or near one corner is lost.

In assembly, the plates are fitted on strip 10 or strip 62. The spacing of the terminals in the slots is such as to have them coincide with the conductors on support strip 10 or 62 when the plates are fully inserted on the strips. Accordingly, the assembly consists in merely inserting the plates on the strips, and severing or otherwise separating the strip into individual units. Where notches 30, or recesses 32 or both are used, the plate slots are fitted therein. This simple operation may be done by hand or by machine.

Figure 1:
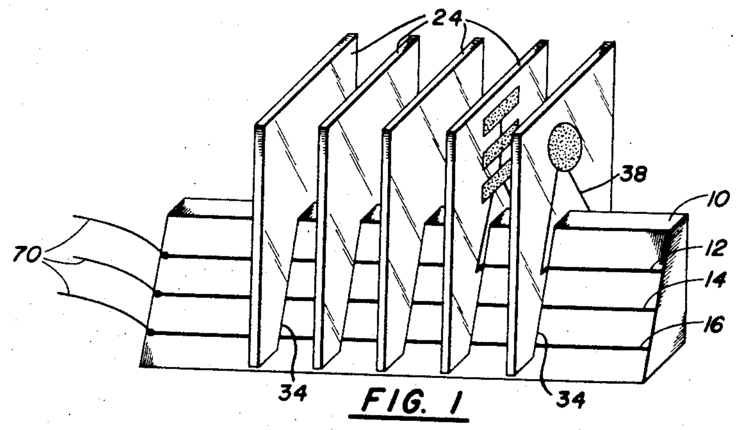
Figure 1 is a perspective view of an electronic component assembly constructed in accordance with the invention.
Figure 5:
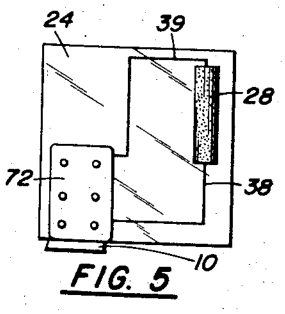
Figure 5 is an end view in elevation of a unit similar to that of Figure 1, the distinction being in the use of a plug attached to an end of the support strip for use where it is desired to have a readily removable unit.
Figure 6:
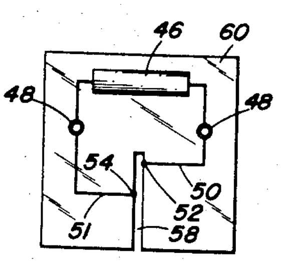
Figure 6 is a plan view of a typical panel useful with the strip of Figure 4, and having a component fixed thereto by eyelets or some other form of rivet.

After the units are formed, as in Figure 1, terminals 70 may be used to connect it in the circuit of the electronic equipment being made. Other means may be adopted for connecting the unit in circuit, an example being in Figure 5, where the pronged plug 72 has been attached to an end of the strip 10, and one strip conductor is secured to each prong.

In most applications, the plates may be held on their support strip by the frictional bond between them. However, in some instances soldering is required, both for mechanically joining the plates and strip, and also for establishing sure circuit continuity. The construction is such that it lends well to dip soldering. The strip will be almost, if not wholly, immersed in fluent solder, and only the lower parts of the plates will be immersed. This being the case, components on the plates might be used regardless of the heat which they will withstand without injury.

The contacts at the slot walls may be made of solder material and in this way several benefits are obtained. Ordinary solder is malleable and is deformed over the strip conductors when the plates are driven in place on support strip 10 or 62. This means that a good electrical connection may be made without soldering. However, should soldering be specified, the contacts then act as a tinning material for subsequent soldering operations.

It is understood that various changes and modifications may be made without departing from the scope of the following claims.

What is claimed is:

1. In an electronic assembly, a support strip of insulating material, electrical conductors fixed on said support strip, at least one wall of said strip being sloped relative to the opposite wall, a plurality of panels having corners, said panels having generally wedge shaped slots near one corner leaving free for component occupancy the remainder of each panel, conductors on said panels terminating at the edges of said slot, said slot being tightly fitted over said support strip and transversely thereof, and the conductors on said panels being in contact with the conductors on said strip.

2. The assembly of claim 1 and said strip having an edge in which there are locking notches, and said panels being fitted in said notches.

3. In an electrical system an apparatus for interconnecting a plurality of circuits comprising in combination an elongated non-conductive member having one wall thereof forming an acute angle with the opposite wall, an assemblage of conductive elements uniformly spaced and mounted on the walls of said member and parallel to the longitudinal axis, a non-conductive plate, an outwardly flaring aperture formed in said plate the edges thereof being parallel to the walls of said member whereby to receive the same, electrical components mounted on said plate, and conductive paths printed on said plate and intercommunicating between component terminals and discrete edge sections of said aperture to engage against selected conductive elements.

4. In an electrical system an apparatus for interconnecting a plurality of circuits comprising in combination an elongated non-conductive member having one wall thereof forming an acute angle with the opposite wall, a plurality of conductive elements uniformly spaced and mounted with respect to each other parallel to the longitudinal axis of said member, a non-conductive plate for supporting electrical components and having formed therein an outwardly flaring opening dimensioned to receive said member in penetrating relationship, the edges of said opening forming the said angle formed by the sides of said member.

5. In an electrical system an apparatus for interconnecting a plurality of circuits comprising in combination an elongated non-conductive member, an assemblage of conductive elements uniformly spaced and mounted with respect to each other on the walls of said member and parallel to the longitudinal axis thereof, a plurality of non-conductive plates each having an aperture formed therein and respectively mounted on said member in straddling relationship, electrical components mounted on said plates, and conductors carried on said plates and interconnecting between component terminals and discrete aperture edge areas to engage against selected elements.

6. In an electrical system an apparatus for interconnecting a plurality of circuits comprising in combination an elongated non-conductive member, a plurality of conductive elements uniformly spaced and mounted with respect to each other on the walls of said member and parallel to the longitudinal axis thereof, a plurality of plates each having a respective aperture formed therein straddling said member in spaced planes perpendicular to the longitudinal axis thereof, the respective apertures having edges conforming to the side walls of said member and bearing thereagainst, electrical components mounted on said plates, conductors on said plates connecting between said components and discrete edge areas, and joiner means to connect respective conductors with selected conductive elements.

7. In a system for interconnecting a plurality of circuits, an elongated insulating member, a plurality of spaced conductive elements mounted on and extending longitudinally along said member, a plurality of insulating plates having edges defining slots to receive said member, electrical components mounted on said plates, terminals on the edges of said plate slots engaging selected conductive elements, and conductors on each plate connecting said components to their respective terminals.

8. A system according to claim 7 wherein said member is formed with longitudinally spaced transverse grooves, and said plates are mounted in said grooves.

9. A system according to claim 7 wherein the slot edges converge inwardly, and said member is wedge-shape in transverse section to provide side walls engaged by said edges.

10. A system according to claim 7 wherein said slot is offset laterally from the center of its respective plate.

References Cited in the file of this patent

UNITED STATES PATENTS

| | | |
|---|---|---|
| 2,226,745 | Schrack | Dec. 31, 1940 |
| 2,607,825 | Eisler | Aug. 19, 1952 |
| 2,693,584 | Pifer | Nov. 2, 1954 |
| 2,701,346 | Powell | Feb. 1, 1955 |